METHOD OF PREVENTING VOIDS IN A MOLDED ARTICLE

Filed Aug. 7, 1969

INVENTOR.
B. D. LEWIS

BY Young & Quigg

ATTORNEYS

US United States Patent Office 3,632,731
Patented Jan. 4, 1972

3,632,731
METHOD OF PREVENTING VOIDS IN A MOLDED ARTICLE
Benjamin D. Lewis, Bartlesville, Okla., assignor to Phillips Petroleum Company, Bartlesville, Okla.
Filed Aug. 7, 1969, Ser. No. 848,261
Int. Cl. B29f 1/00
U.S. Cl. 264—296         4 Claims

ABSTRACT OF THE DISCLOSURE

A method of eliminating voids in the sprue area of a molded article by reducing the cross-sectional area of the sprue adjacent the molded article.

---

Figure 3:
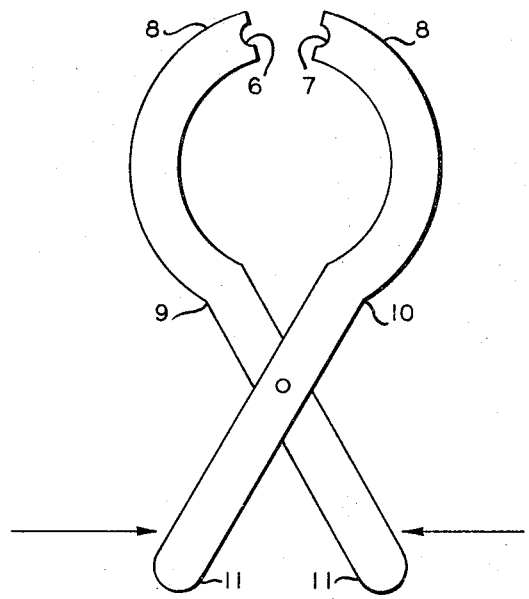

This invention relates to a method of producing improved molded articles. In another aspect, this invention relates to a method of eliminating voids in the sprue area of a molded article.

In the molding of articles from polymers, such as polyethylene, polypropylene, and the like, a void often forms in the gate which is the area at the junction of the sprue and the molded article. The occurrence of a void increases as the size of the sprue increases and becomes particularly acute when using high and extra-high molecular weight polymers which necessitate utilizing sprues having a large cross-sectional area and maintaining said sprue in place until the molded article sets. During finishing operations, the sprue is removed from the molded article. In the situations where a void has formed in the gate, the void will extend across the junction of the sprue and gate and into the exterior wall of the finished article defining a concave-shaped depression. It is well known in the art that the gate area of an injection molded article is often the weakest portion of the article. The concave area caused by the void is also unsightly and further weakens the article at said gate to the extent that such malformed articles are often rejected. The formation of voids in the sprue area of a molded article thereby produces defective products that result in the waste of material, labor, power, and equipment. It is especially important that such defects be eliminated from articles such as pipe fittings requiring a specific wall thickness for withstanding elevated pressures.

It is therefore an object of this invention to provide a method of producing improved molded articles. Another object of this invention is to provide a method of eliminating or preventing the formation of voids in the sprue area of a molded article. Other aspects, objects, and advantages of the present invention will become apparent from a study of the disclosure, the appended claims, and the drawing.

Figure 2:
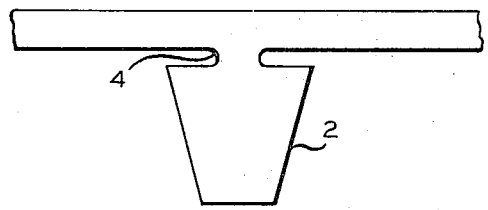
Figure 1:
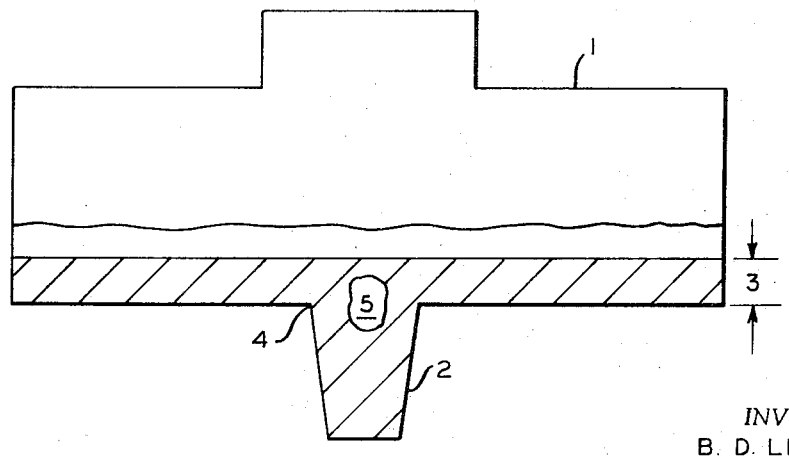

FIG. 1 is an elevation view partially in cross section of a molded article showing the sprue attached to the article. FIG. 2 is an enlarged sectional view of the sprue area of the article after said sprue has been deformed. FIG. 3 is a plan view of one embodiment of the structure for deforming the sprue.

Referring to FIG. 1, a molded article 1 has a sprue 2 attached thereto. The molded article 1 has a desired wall thickness 3, said thickness being reduced by a void 5 at the gate 4 of the molded article 1. Referring to FIG. 2, the sprue 2 has been deformed in the gate area 4 thereby eliminating or preventing the formation of a void in the molded article.

In the method of this invention, a structure is moved into contact with parts of the sprue adjacent the molded article. The structure is then forced into the sprue while the material forming said sprue is in a deformable condition. Deforming the sprue can be accomplished while the molded article is still in the mold or immediately after removal from the mold. Forcing the structure into the sprue reduces the cross-section area of the sprue adjacent the molded article. As the cross-sectional area is reduced, the material is caused to compact and fill voids presently in existence. Since these voids are thought to be caused either by shrinkage or heat, reduction of the cross-sectional area of the sprue also functions to provide an area of more rapid cooling, thereby preventing the formation of a void. After the material has set, the sprue is removed by conventional methods thereby providing an article having no depression in the gate area. Setting of the material forming the article is dependent upon time, cooling, or other factors dictated by the type of molding material utilized.

It has been found that the cross-sectional area of the sprue adjacent the molded article should be reduced to a cross-sectional area in the range of 30% to 50% of the original cross-sectional area of said sprue. Larger reduced cross-sectional areas do not assure the elimination of the voids, and smaller reduced cross-sectional areas often place undesirable stresses in the material forming the molded article. In order to uniformly compress the molding material and induce cooling for the elimination and prevention of voids in the molded article, it is preferred that a groove circumscribing the sprue be formed on the sprue by the structure. It is also preferred that one surface of the portion of the structure moving in contact with the molding material of the sprue to form the area of reduced cross section be in contact with a surface of the molded article to assure compaction of the material at the juncture of the sprue and the molded article. The structure can be any suitable device which deforms the sprue in the manner described. Such devices, for example, are pliers or specially shaped tools that are hand operated or preferably function automatically. FIG. 3 shows an example structure that can be utilized for deforming the sprue. First and second deforming surfaces 6, 7 having a diameter in the range of 30%–50% of the diameter of the sprue to be deformed are found on adjacent first ends 8 of first and second structure elements 9, 10. The structure elements 8, 9 are pivotally attached one to the other for movement between a first position wherein the deforming surfaces 6, 7 are spaced one from the other (shown) and a second position wherein the first ends 8 of the elements 8, 9 are in contact (not shown) for deforming the sprue positioned therebetween. Movement of the first ends 8 of the structure is in response to forces applied to the second ends 11 of the structure elements 9, 10. Since these structures are easily constructed, their design is not considered a part of this invention.

In an example of this invention, a reciprocating screw injection molding machine was used to mold 2-inch pipe fittings from extra-high molecular weight, butene ethylene copolymer having a density of .943 and a high-load melt index of 1.5 under the following conditions:

Part weight 206 grams
Cycle time—3 minutes
Mold temperature—45° F.
Zone 1 temperature (nozzle)—450° F.
Zone 2 temperature (adjacent nozzle)—450° F.
Zone 3 temperature (adjacent hopper)—425° F.
Sprue diameter adjacent molded article—.725 inch
Sprue diameter adjacent molded article after deformation—.300 inch Parts made under the above conditions with sprues deformed immediately after removing parts from the mold exhibited no voids in the sprue area.

Other modifications and alterations of this invention will become apparent to those skilled in the art from

What is claimed is:

1. In a method of preventing voids in the sprue area of an injection molded article, the improvement comprising:
applying a force to the sprue adjacent the molded article to reduce the cross-sectional area of said sprue while maintaining said sprue on said molded article, said force being applied to said sprue while the sprue is in a deformable condition from the molding operation and said force being applied to said sprue in a direction substantially along the plane of the adjacent surface of the molded article.

2. A method, as set forth in claim 1, wherein the cross-sectional area of the sprue adjacent the molded article is reduced to a cross-sectional area in the range of 30% to 50% of the original cross-sectional area of said sprue.

3. A method, as set forth in claim 1, wherein a groove circumscribing the sprue is formed on the sprue.

4. A method, as set forth in claim 1, wherein one surface of a portion of a structure moving in contact with the sprue to form the area of reduced cross-section is in contact with a surface of the molded article.

References Cited

UNITED STATES PATENTS

| | | | |
|---|---|---|---|
| 2,148,079 | 2/1939 | Martin, Jr. | 18—DIG 18 |
| 3,031,718 | 5/1962 | Adams | 18—DIG 18 |
| 3,265,797 | 8/1966 | Spaak et al. | 264—328 X |
| 3,299,193 | 1/1967 | Vergara | 18—DIG 18 |
| 3,301,931 | 1/1967 | Morin | 264—161 X |
| 3,350,487 | 10/1967 | Hofer et al. | 264—161 |
| 3,374,304 | 3/1968 | Ayres | 264—328 X |
| 3,443,001 | 5/1969 | Adair et al. | 264—161 |

ROBERT F. WHITE, Primary Examiner

A. M. SOKAL, Assistant Examiner

U.S. Cl. X.R.

18—DIG 18; 264—161, 328